United States Patent
Shimizu et al.

(10) Patent No.: US 11,698,576 B2
(45) Date of Patent: Jul. 11, 2023

(54) PROJECTION DEVICE HAVING ROTATION LOCK MECHANISM AND PROJECTION LENS HAVING ROTATION LOCK MECHANISM

(71) Applicant: FUJIFILM Corporation, Tokyo (JP)

(72) Inventors: Hitoshi Shimizu, Saitama (JP); Yasuyuki Miyata, Saitama (JP); Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

(21) Appl. No.: 17/206,228

(22) Filed: Mar. 19, 2021

(65) Prior Publication Data

US 2021/0208490 A1 Jul. 8, 2021

Related U.S. Application Data

(63) Continuation of application No. PCT/JP2019/037101, filed on Sep. 20, 2019.

(30) Foreign Application Priority Data

Sep. 21, 2018 (JP) .................................. 2018-178126

(51) Int. Cl.
*G03B 21/14* (2006.01)
*G03B 21/16* (2006.01)

(52) U.S. Cl.
CPC ........... *G03B 21/16* (2013.01); *G03B 21/142* (2013.01); *G03B 21/145* (2013.01)

(58) Field of Classification Search
CPC ..... G03B 21/16; G03B 21/142; G03B 21/145
See application file for complete search history.

(56) References Cited

U.S. PATENT DOCUMENTS 5,469,236 A * 11/1995 Roessel .................. G02B 23/08
359/402
2004/0095559 A1 5/2004 Arai et al.
(Continued)

FOREIGN PATENT DOCUMENTS

CN 101165395 A 4/2008
CN 101676793 A 3/2010
(Continued)

OTHER PUBLICATIONS

European Communication pursuant to Article 94(3) EPC for corresponding European Application No. 19863848.8, dated Oct. 27, 2021.
(Continued)

*Primary Examiner* — Bao-Luan Q Le
(74) *Attorney, Agent, or Firm* — Birch, Stewart, Kolasch & Birch, LLP

(57) ABSTRACT

A projection device includes a drive housing that includes a protruding portion protruding from a central portion, a projection lens that includes a first rotation mechanism, and fans that draw in or discharge gas; the central portion includes a first A side surface that is provided in a first A direction X1 corresponding to one side in a first direction X and a second A side surface that is provided in a first B direction X2 corresponding to the other side in the first direction X; the protruding portion includes a first B side surface in the first A direction X1 and includes a second B side surface, which faces the projection lens, in the first B direction; and the fans face the second A side surface and the second B side surface.

5 Claims, 17 Drawing Sheets

(56) References Cited

U.S. PATENT DOCUMENTS

| | | |
|---|---|---|
| 2006/0176453 A1 | 8/2006 | Miyamoto |
| 2007/0081131 A1 | 4/2007 | Van Der Palen et al. |
| 2008/0094580 A1 | 4/2008 | Nakagawa et al. |
| 2009/0219505 A1 | 9/2009 | Kitahara et al. |
| 2011/0019159 A1 | 1/2011 | Egawa et al. |
| 2011/0157560 A1* | 6/2011 | Hsiao .................... G03B 21/16 353/58 |
| 2011/0261033 A1 | 10/2011 | Matsumoto et al. |
| 2013/0250250 A1* | 9/2013 | Lin ....................... G03B 21/16 353/57 |
| 2015/0029470 A1 | 1/2015 | Kanai et al. |
| 2015/0241047 A1* | 8/2015 | Ishikawa .................. F21V 7/00 353/57 |
| 2016/0109788 A1* | 4/2016 | Yanagihara ............. G03B 21/16 353/57 |
| 2016/0246034 A1 | 8/2016 | Amano |
| 2017/0205691 A1* | 7/2017 | Takasuka ............. G03B 21/145 |
| 2018/0217477 A1* | 8/2018 | Kurota ................. G03B 17/54 |
| 2018/0246037 A1 | 8/2018 | Amano |
| 2019/0025679 A1 | 1/2019 | Kuroda |
| 2019/0219802 A1 | 7/2019 | Kuroda |

FOREIGN PATENT DOCUMENTS

| | | | |
|---|---|---|---|
| CN | 101963745 A | | 2/2011 |
| CN | 204945473 U | * | 1/2016 |
| CN | 207396953 U | | 5/2018 |
| JP | 9-197341 A | | 7/1997 |
| JP | 09197341 A | * | 7/1997 |
| JP | 09304833 A | * | 11/1997 |
| JP | 10-221779 A | | 8/1998 |
| JP | 2006-23361 A | | 1/2006 |
| JP | 2006201292 A | * | 8/2006 |
| JP | 2007-515681 A | | 6/2007 |
| JP | 2007-328022 A | | 12/2007 |
| JP | 2012-98506 A | | 5/2012 |
| JP | 2012098506 A | * | 5/2012 |
| JP | 2016-156983 A | | 9/2016 |
| JP | 2016-156986 A | | 9/2016 |
| JP | 2017-83495 A | | 5/2017 |
| JP | 2017-142281 A | | 8/2017 |
| JP | 2017142281 A | * | 8/2017 |
| JP | 2017-207688 A | | 11/2017 |
| JP | 2016-31936 A | | 3/2018 |
| WO | WO 2017/169903 A1 | | 10/2017 |
| WO | WO 2018/055963 A1 | | 3/2018 |
| WO | WO-2019169819 A1 | * | 9/2019 |

OTHER PUBLICATIONS

European Search Report for corresponding European Application No. 19863848.8, dated Oct. 14, 2021.
Chinese Office Action for corresponding Chinese Application No. 201980061497.9, dated Feb. 7, 2022, with English translation.
International Preliminary Report on Patentability and Written Opinion of the International Searching Authority, with an English translation (forms PCT/IB/373, PCT/ISA/237 and PCT/IB/326), dated Apr. 1, 2021, for corresponding International Application No. PCT/JP2019/037101.
International Search Report (form PCT/ISA/210, dated Dec. 10, 2019, for corresponding International Application No. PCT/JP2019/037101, with an English translation.
Chinese Office Action and Search Report for corresponding Chinese Application No. 201980061497.9, dated Sep. 23, 2021, with English translation of the Office Action.
Chinese Office Action for corresponding Chinese Application No. 201980061497.9, dated Jun. 20, 2022, with English translation.
European Communication pursuant to Article 94(3) EPC for corresponding European Application No. 19863848.8, dated Jun. 15, 2022.

* cited by examiner

PROJECTION DEVICE HAVING ROTATION LOCK MECHANISM AND PROJECTION LENS HAVING ROTATION LOCK MECHANISM

CROSS-REFERENCE TO RELATED APPLICATIONS

This application is a Continuation of PCT International Application No. PCT/JP2019/037101 filed on 20 Sep. 2019, which claims priority under 35 U.S.C § 119(a) to Japanese Patent Application No. 2018-178126 filed on 21 Sep. 2018. The above application is hereby expressly incorporated by reference, in its entirety, into the present application.

BACKGROUND OF THE INVENTION

1. Field of the Invention

The present invention relates to a projection device and a projection lens.

2. Description of the Related Art

In recent years, a projection device on which an image forming panel, such as a liquid crystal display element or a digital micromirror device (DMD) element, is mounted has become widespread and has been improved in performance.

JP2016-156986A (corresponding to US2016/246037A1) discloses a liquid crystal projection device that irradiates a transmission type liquid crystal panel with light emitted from a light source and projects an image displayed on the liquid crystal panel onto a screen by a projection lens.

A liquid crystal projection device disclosed in JP2012-098506A comprises a projection lens that comprises two reflecting members for bending an optical axis, bends luminous flux, which is emitted from a liquid crystal panel illuminated by a light source, in a U shape by the two reflecting members, and projects the luminous flux onto a screen. The U-shaped projection lens can cause the projection device main body to be compact and cause the entire projection device system, which includes the projection device and the screen, to be compact.

SUMMARY OF THE INVENTION

The invention has been made in consideration of the above-mentioned background, and an object of the invention is to provide a projection device and a projection lens having high convenience.

In order to achieve the object, a projection device according to an embodiment comprises: an electro-optical element; a drive housing that stores the electro-optical element and includes a central portion and a protruding portion protruding from the central portion; a recessed portion; a projection lens that is disposed in the recessed portion, projects light applied from the electro-optical element onto a projection target, and includes a first rotation mechanism; and fans that are disposed in the drive housing and draw in or discharge gas. The recessed portion and the protruding portion are adjacent to each other in a first direction, the projection lens is provided so as to extend to the recessed portion from the drive housing in a second direction crossing the first direction, the central portion includes a first A side surface that is provided in a first A direction corresponding to one side in the first direction and a second A side surface that is provided in a first B direction corresponding to the other side in the first direction, the protruding portion includes a first B side surface in the first A direction and includes a second B side surface, which faces the projection lens, in the first B direction, and the fans face the second A side surface and the second B side surface.

Alternatively, it is preferable that a projection device according to an embodiment is a projection device comprising: an electro-optical element; a drive housing that stores the electro-optical element; a recessed portion; a projection lens that is disposed in the recessed portion, projects light applied from the electro-optical element onto a projection target, and includes a first rotation mechanism; and a first lock unit that is provided on the projection lens and switches a state of the first rotation mechanism between rotatable and not rotatable.

Alternatively, it is preferable that a projection device according to an embodiment is a projection device comprising: an electro-optical element; a drive housing that stores the electro-optical element and includes a central portion and a protruding portion protruding from the central portion; a recessed portion; a projection lens that is disposed in the recessed portion, projects light applied from the electro-optical element onto a projection target, and includes a first rotation mechanism; and three foot portions that are provided on a bottom of the drive housing, and the recessed portion and the protruding portion are adjacent to each other in a first direction, the projection lens is provided so as to extend to the recessed portion from the drive housing in a second direction crossing the first direction, and one of the foot portions is provided on the bottom of the protruding portion and two of the foot portions are provided on the bottom of the central portion.

Alternatively, it is preferable that a projection device according to an embodiment is a projection device comprising: an electro-optical element; a drive housing that stores the electro-optical element and includes a central portion and a protruding portion protruding from the central portion; a recessed portion; a projection lens that is disposed in the recessed portion, projects light applied from the electro-optical element onto a projection target, and includes a first rotation mechanism and a second rotation mechanism; and an insertion opening that is provided in the drive housing and is connected to an external power source or an external device, and the recessed portion and the protruding portion are adjacent to each other in a first direction, the projection lens is provided so as to extend to the recessed portion from the drive housing in a second direction crossing the first direction, the central portion includes a first A side surface that is provided in a first A direction corresponding to one side in the first direction and a second A side surface that is provided in a first B direction corresponding to the other side in the first direction, the protruding portion includes a first B side surface in the first A direction and includes a second B side surface, which faces the projection lens, in the first B direction, and the insertion opening is provided on the second A side surface, the first A side surface, or the first B side surface.

A projection lens according to this embodiment comprises: an incident portion on which light is incident in a second direction; a first optical axis bending member that bends light emitted from the incident portion in a third direction crossing the second direction; a second optical axis bending member that bends light emitted from the first optical axis bending member in the second direction; a first intermediate optical system and a second intermediate optical system that are provided between the first optical axis bending member and the second optical axis bending member on an optical path; and a second rotation mechanism that includes the second intermediate optical system and does not include the first intermediate optical system.

DESCRIPTION OF THE PREFERRED EMBODIMENTS

<Projection Device Main Body>

Figure 1:
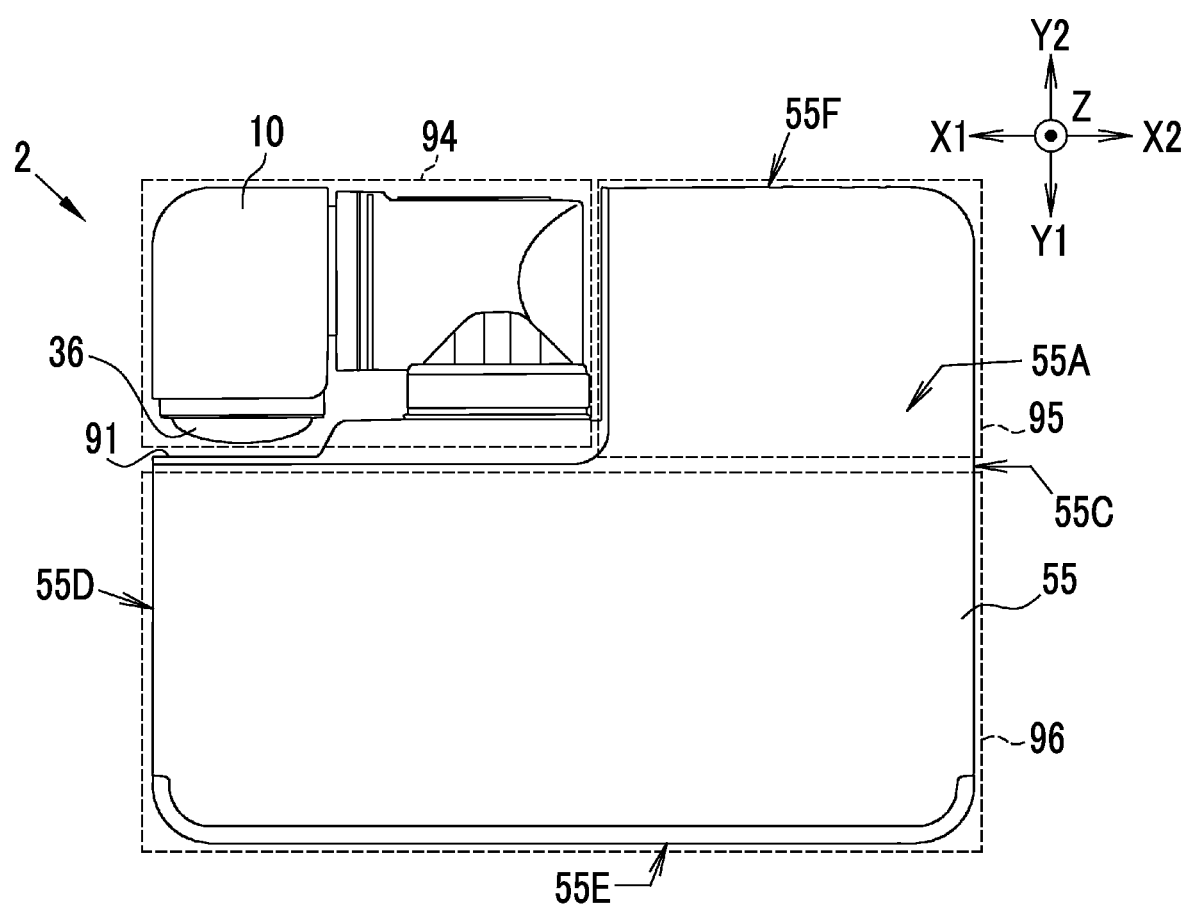
FIG. 1 is a plan view showing the storage state of a projection device according to an embodiment of the invention that is viewed from a surface side.

FIG. 1 is a plan view of a projection device 2 that is viewed from a top surface 55A side. As shown in FIG. 1, the projection device 2 according to this embodiment comprises a projection lens 10 and a drive housing 55 that is a projection device main body. The drive housing 55 comprises a top surface 55A, a bottom surface 55B, a first side surface 55C, a second side surface 55D, a third side surface 55E, and a fourth side surface 55F. Further, the drive housing 55 includes a retracting portion 91 so as to correspond to the degree of protrusion of an emission lens 36 positioned at the distal end of the projection lens 10. Furthermore, the projection device 2 mainly consists of three portions, that is, a recessed portion 94 and a protruding portion 95 and a central portion 96 of the substantially L-shaped drive housing 55. The projection lens 10 is provided so as to extend to the recessed portion 94 from the central portion 96 (a part of the drive housing 55) in a second direction Y. Further, the recessed portion 94 can store the projection lens 10. Furthermore, the drive housing 55 includes the protruding portion 95 corresponding to the recessed portion 94. The recessed portion 94 and the protruding portion 95 are adjacent to each other in a first direction X.

Figure 2:
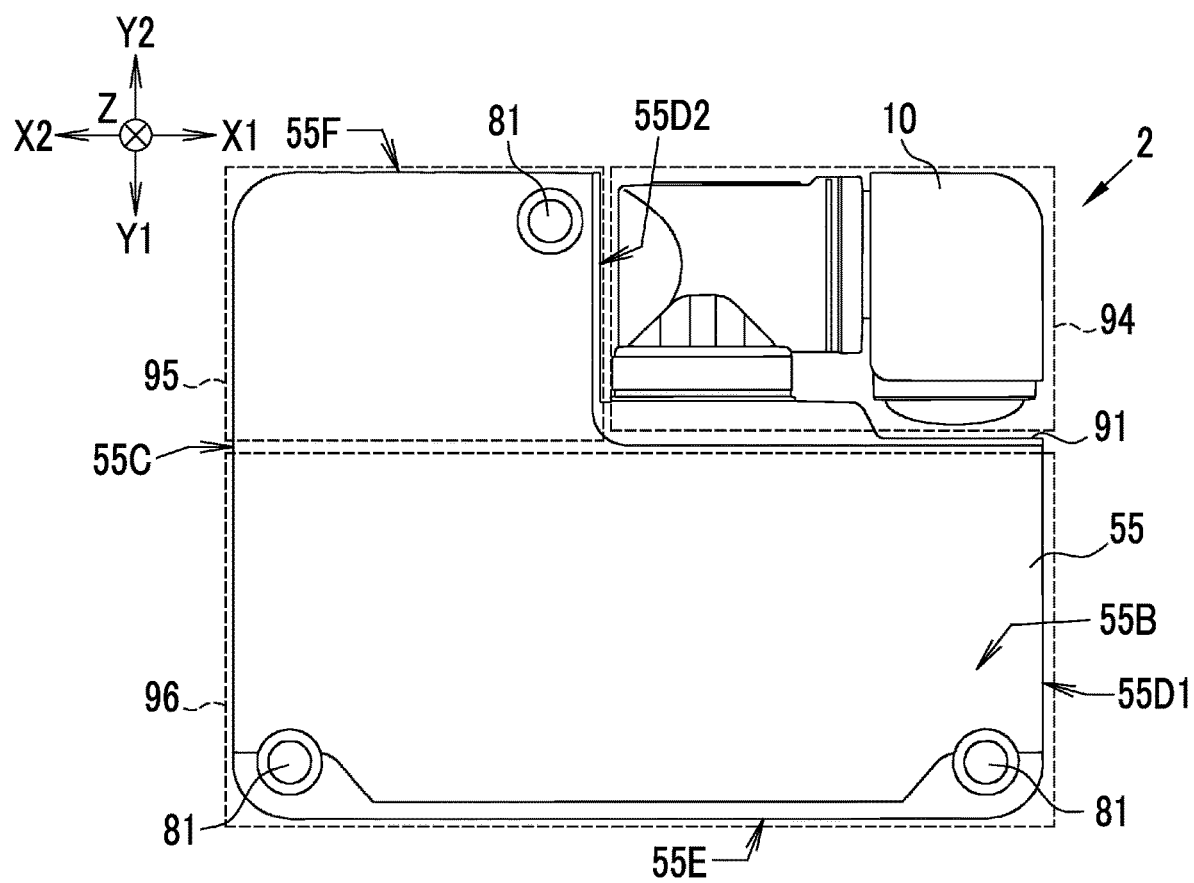
FIG. 2 is a plan view showing the storage state of the projection device according to the embodiment of the invention that is viewed from a bottom side.

FIG. 2 is a plan view of the projection device 2 that is viewed from the bottom surface 55B side. The bottom surface 55B includes three foot portions 81, one foot portion 81 is disposed on the protruding portion 95, and two foot portions 81 are disposed on the central portion 96. The second side surface 55D includes a second A side surface 55D1 in a second A direction Y1 corresponding to one side in the second direction Y, and includes a second B side surface 55D2 in a second B direction Y2 corresponding to the other side in the second direction Y. The foot portion 81 disposed on the protruding portion 95 is disposed at a corner corresponding to the second B side surface 55D2 and the fourth side surface 55F. Further, the two foot portions 81 disposed on the central portion 96 are disposed at the corners of the third side surface 55E. More specifically, on the bottom surface 55B, one foot portion 81 is disposed at a corner provided in a first A direction X1 corresponding to one side in the first direction X and one foot portion 81 is disposed at a corner provided in a first B direction X2 corresponding to the other side in the first direction X.

These three foot portions 81 are arranged in a triangular shape and the projection device 2 is supported by a surface formed by these three foot portions 81. Since the drive housing 55 of the invention has a substantially L shape, it is preferable that the foot portion 81 is disposed on the fourth side surface 55F side at a position close to the projection lens 10 as much as possible. On the other hand, it is preferable that the foot portion 81 is not disposed at a corner positioned on the side in the first B direction X2 among the corners of the protruding portion 95. A stable support surface can be formed by the three foot portions 81, and there is a concern that the inclination and shake of the projection device may be caused in a case where the foot portions 81 are too close to each other. Each foot portion 81 may also be adapted so that a distance by which each foot portion 81 protrudes from the bottom surface 55B can be adjusted.

Figure 3:
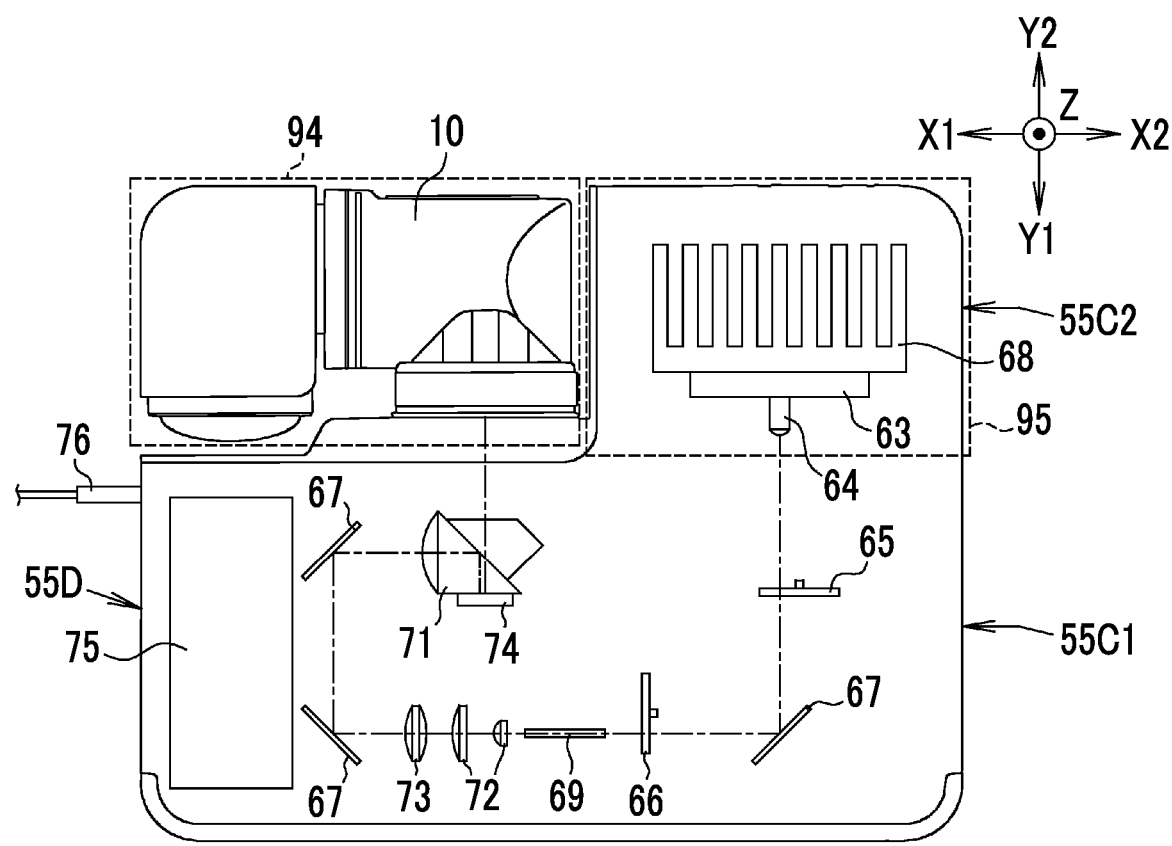
FIG. 3 is a plan view of a main part of the projection device.

FIG. 3 is a plan view showing a main part of the projection device 2. The projection device 2 comprises a light source module 63 and a heat sink 68 that are provided in the protruding portion 95. The light source module 63 drives a laser element serving as a light source 64, and the heat sink 68 cools the light source module. Further, the projection device 2 includes a phosphor wheel 65 that converts the color of light of the laser element, a color filter wheel 66, a light pipe 69 that guides light, a relay lens 72, a condenser lens 73, and a plurality of mirror members 67. After passing through the respective optical members, laser light passes through a total internal reflector (TIR) prism 71. Then, a part of the laser light is reflected by a DMD element 74 serving as an electro-optical element and the inside of the projection lens 10 is irradiated with the reflected laser light. The projection lens 10 displays a projected image on a projection target. The color of the laser light is not particularly limited. In a case where a user wants to form a light source using a one-color light source, it is preferable that the light source is formed of a blue light source and green light and red light are generated through conversion using blue light and a phosphor. Further, the mirror member 67 may be either a member that specularly reflects light or a member that totally reflects light.

The laser element is an example of the light source 64. However, the light source 64 is not limited thereto, and may be a light-emitting diode element, such as an LED. Further, a red light source, a blue light source, and a green light source may be prepared as the light source. Furthermore, the projection device 2 may directly project light from an electro-optical element, such as a display panel, such as an organic EL panel or a LED panel, as in a head-up display without using a light source. Moreover, the DMD element 74 is an example of the electro-optical element. However, the electro-optical element is not limited thereto, and a liquid crystal panel transmitting a part of light emitted from the light source may be used as the electro-optical element. In this case, not the TIR prism 71 but a dichroic prism may be used.

As long as the heat sink 68 is made of metal, such as aluminum or copper, so as to have a large surface area, the shape of the heat sink 68 is not particularly limited. For example, the shape of a heat sink including a plurality of fins as shown in FIG. 3 is generally used. The shape of the heat sink 68 is disclosed in, for example, US2015/0029470A1, US2006/0176453A1, US2011/0261033A1, and JP2018-031936A.

In FIG. 3, a power cable 76 is inserted into the second side surface 55D and power from the outside is supplied to a drive circuit 75. The drive circuit 75 includes a controller that controls the operation of the projection device 2, an image processing unit that forms an image having three colors of R, G, and B using an electro-optical element, and the like. The drive circuit 75 is disposed not to overlap with the mirror 67, the TIR prism 71, and the DMD element 74, but the disposition of the drive circuit 75 is not limited thereto. The drive circuit 75 may be disposed so as to overlap with the respective optical members. The details of an insertion opening for the power cable will be described in a case where the description of FIG. 10 will be made.

Figure 4:
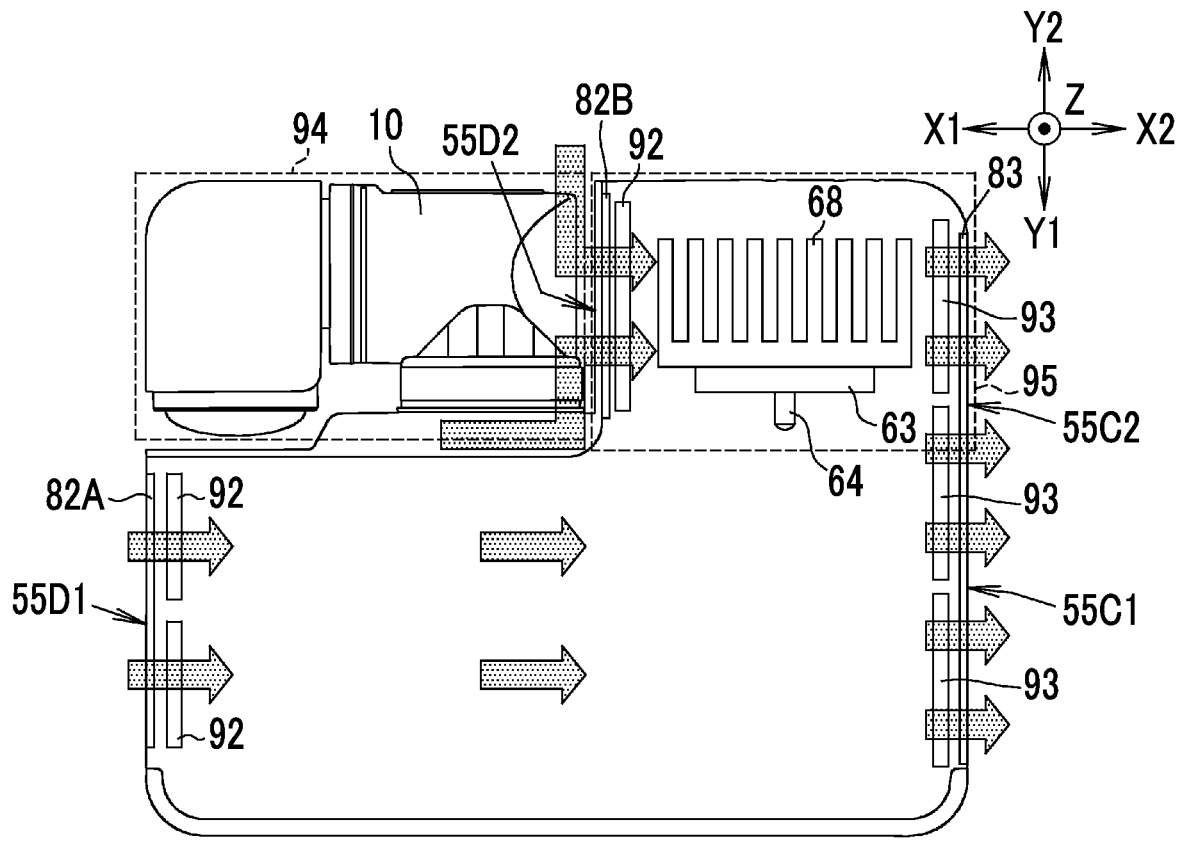
FIG. 4 is a plan view of a main part of the projection device.

As shown in FIG. 4, the projection device 2 includes an exhaust port 83 on the first side surface 55C side and includes an intake port 82 on the second side surface 55D side. In more detail, a first intake port 82A is disposed on the second A side surface 55D1 and a second intake port 82B is disposed on the second B side surface 55D2 of the protruding portion 95. Accordingly, first fans and second fans are disposed so as to correspond to the intake or exhaust port 82 or 83. The second B side surface 55D2 faces the projection lens 10, but an intake port or an exhaust port is also formed on the second B side surface 55D2 to improve the cooling efficiency of the projection device 2. In FIG. 4, the first fan corresponds to an intake fan 92 and the second fan corresponds to an exhaust fan 93. The intake fans 92 and the exhaust fans 93 are arranged. More intake fans 92 are arranged in the first intake port 82A than in the second intake port 82B.

Arrows shown in FIG. 4 indicate the flow of wind. Since the intake or exhaust port 82 or 83 described in this embodiment are disposed, wind can be directly and sufficiently applied to the light source module 63, the light source 64, and the heat sink 68 provided in the protruding portion 95 as shown by the arrows. Accordingly, the projection device 2 can cool these members with high efficiency. An intake port may be disposed on a first B side surface 55C2 of the protruding portion 95, and an exhaust port may be disposed on the second B side surface 55D2. Since wind having heat is applied to the projection lens 10 from the exhaust port in the case of this configuration, there is a concern that the degradation of the members of the projection lens 10 may be caused. Accordingly, it is most preferable that the intake port and the exhaust port are disposed as shown in FIG. 4.

Figure 5:
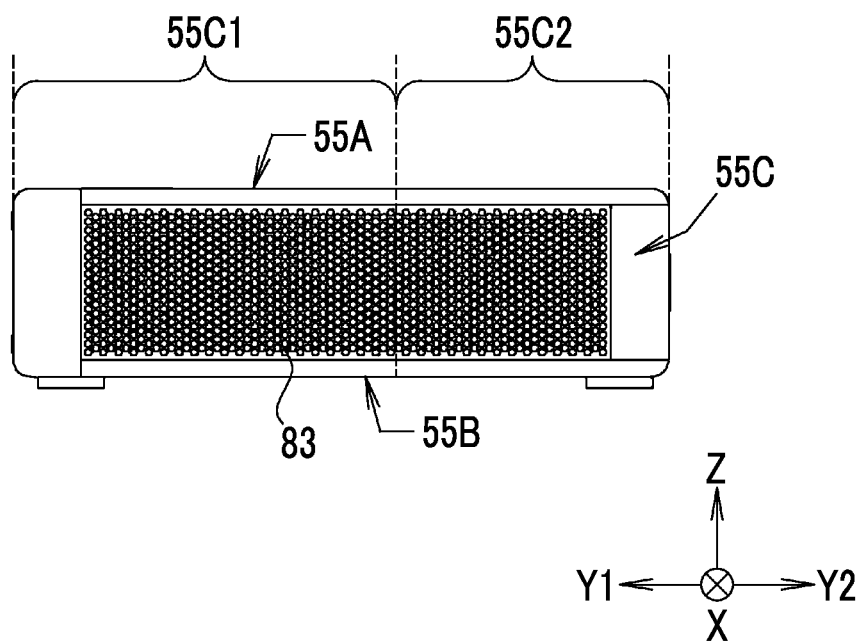
FIG. 5 is a diagram of a first side surface showing the storage state of the projection device.

The details of the intake or exhaust port 82 or 83 will be described with reference to FIGS. 5, 6, and 7. FIG. 5 is a side view of the projection device 2 that is viewed from the first side surface 55C side. In the projection device 2, an exhaust port 83 is integrally formed on the first A side surface 55C1 and the first B side surface 55C2. Since the exhaust port 83 is integrally formed so as to have a large size unlike the intake port 82 to be described later, the exhaust port 83 has high exhaust efficiency. In the projection device 2, the exhaust port 83 is formed to be larger than the intake port 82 as described above.

Figure 6:
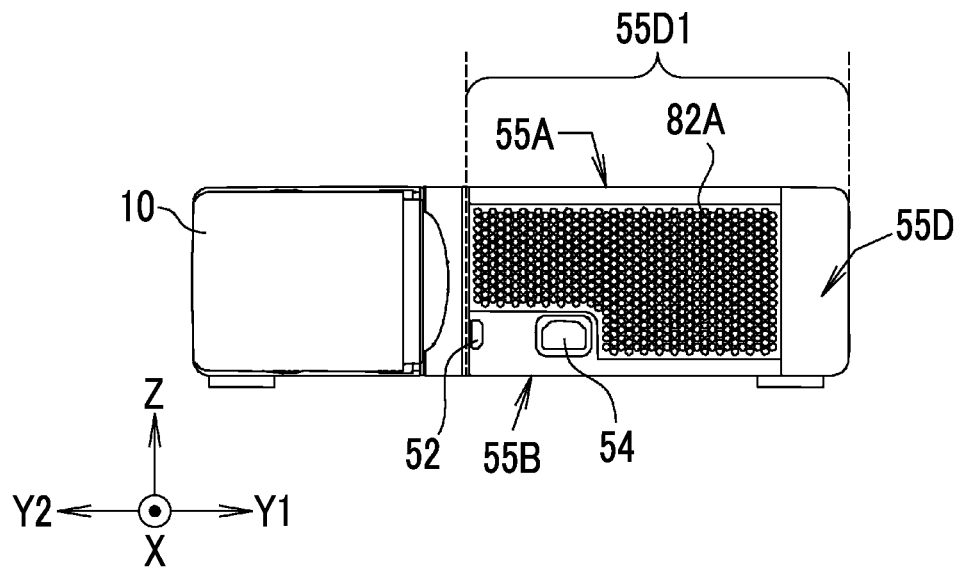
FIG. 6 is a diagram of a second side surface showing the storage state of the projection device.
Figure 7:
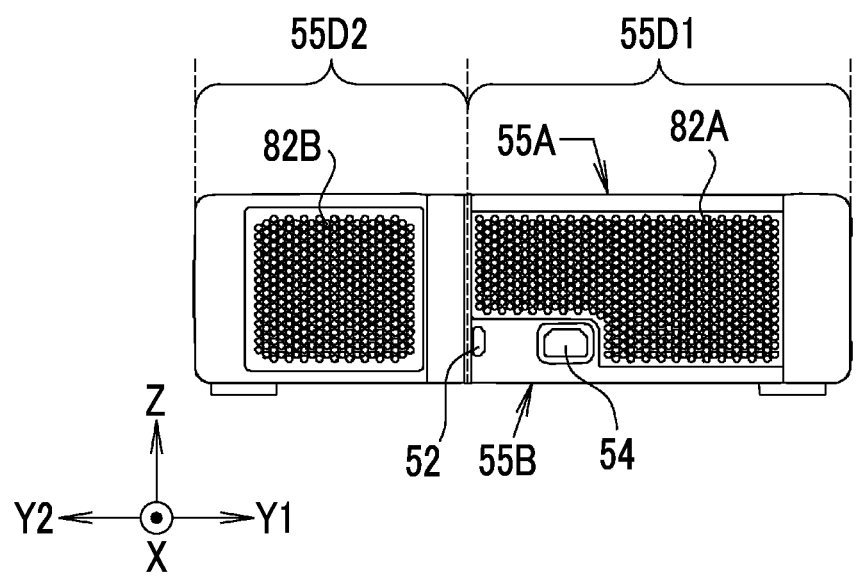
FIG. 7 is a diagram of the first side surface of the projection device in a case where the projection lens is removed.

FIG. 6 is a side view of the projection device 2 that is viewed from the second side surface 55D side. In the projection device 2, the first intake port 82A is formed on the second A side surface 55D1. Further, a power cable port 54 (an example of an insertion opening) for the power cable and a video cable port 52 (an example of an insertion opening) for a video cable are formed on the second A side surface 55D1. A video cable connects the projection device 2 to an external device, such as a personal computer outputting video signals. For example, an HDMI (registered trademark) cable, a DVI cable, and a VGA cable can be used as the type of the video cable. FIG. 7 is a diagram where the projection lens 10 is separated from FIG. 6. The second B side surface 55D2 is provided with the second intake port 82B as described above.

Figure 8:
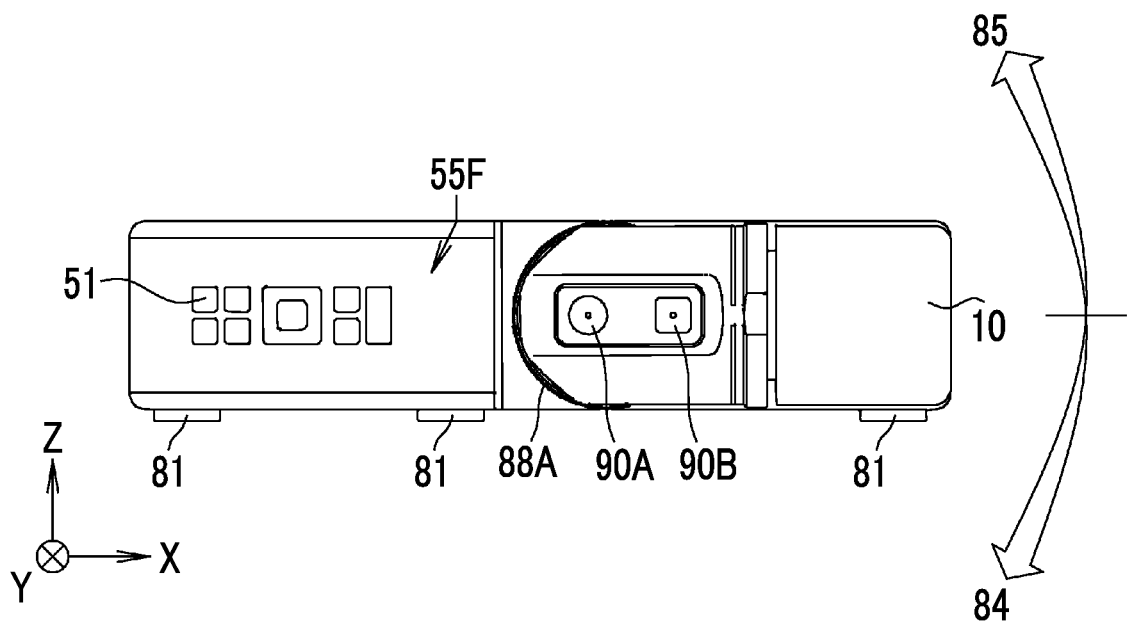
FIG. 8 is a diagram of a third side surface showing the storage state of the projection device.

FIG. 8 is a side view of the projection device 2 that is viewed from the fourth side surface 55F side. As shown in FIG. 8, operation switches 51 used to perform user's operations, such as the adjustment of the quality of an image, the keystone correction of an image, and the ON and OFF of a power source, are formed on the fourth side surface 55F. A first lock switch 90A (an example of a first lock unit) and a second lock switch 90B (an example of a second lock unit), which switch the state of the rotation mechanism of the projection lens 10 between rotatable and not rotatable, are formed on the surface of the projection lens 10. The details of the switches will be described later. Further, the projection lens 10 is rotated about a first rotation mechanism 88A, which is disclosed in FIGS. 8 and 10, on a plane formed by the first direction X and a third direction Z. More specifically, the projection lens 10 is adapted to be rotatable in a first rotation direction 84 and a second rotation direction 85. The three foot portions 81 are formed on the bottom of the projection device 2.

Figure 9:
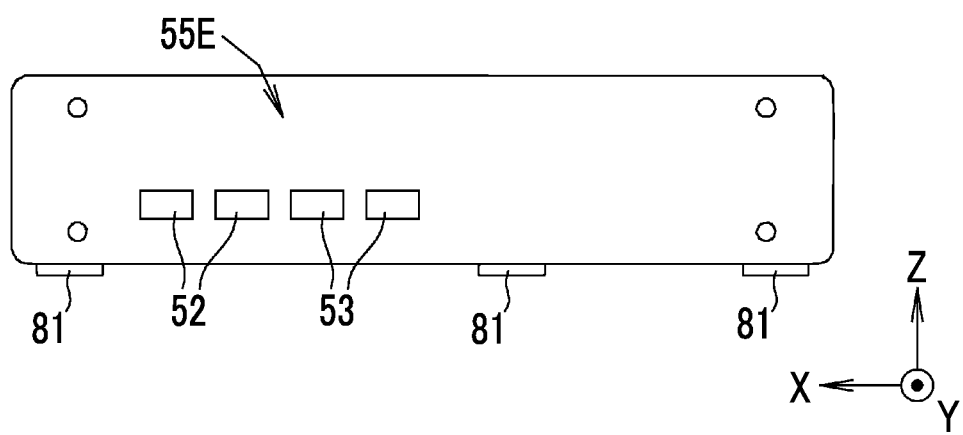
FIG. 9 is a diagram of a fourth side surface showing the storage state of the projection device.

FIG. 9 is a side view of the projection device 2 that is viewed from the third side surface 55E. As shown in FIG. 9, external device cable ports 53 (an example of an insertion opening) and video cable ports 52 used to be connected to external devices, such as USB memories and hard disk drives, are formed on the third side surface 55E. On the other hand, the power cable port 54 provided on the second side surface 55D is not formed on the third side surface 55E.

Figure 10:
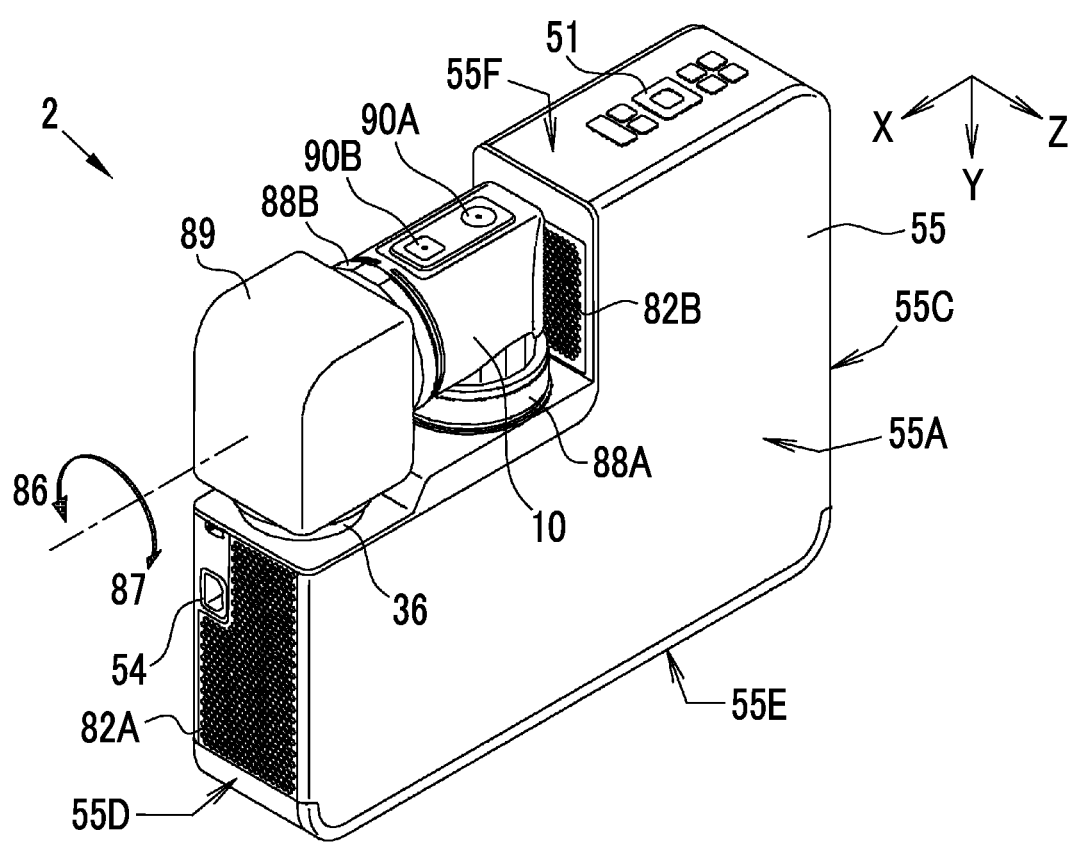
FIG. 10 is a perspective view showing the storage state of the projection device.

FIG. 10 is a perspective view showing a state where the projection lens 10 of the projection device 2 is stored. Further, FIG. 10 is a diagram where the projection device 2 is vertically placed with the third side surface 55E as a bottom portion and with the fourth side surface 55F as an upper portion. The length of the third side surface 55E in a longitudinal direction is longer than the length of the first side surface 55C (the total length of the first A side surface 55C1 and the first B side surface 55C2) in a longitudinal direction. Accordingly, the third side surface 55E has a large area and can be used as a bottom portion in a case where the projection device 2 is vertically placed. The projection lens 10 according to this embodiment comprises not only the first rotation mechanism 88A but also a second rotation mechanism 88B that is rotatable in a third rotation direction 86 and a fourth rotation direction 87. Accordingly, even in a case where the projection device 2 is vertically placed, the projection device 2 can project an image in all directions as shown in FIGS. 17 to 27. Further, since the operation switches 51 are positioned at the upper portion even in a case where the projection device 2 is vertically placed, a user easily operates the operation switches 51.

The projection device 2 is also assumed to be vertically placed with the third side surface 55E as a bottom portion as described above. That is, the power cable port 54 (an example of an insertion opening) for the power cable 76 shown in FIG. 3 is formed not on the third side surface 55E but on the second side surface 55D. The reason for this is that the power cable port 54 cannot be disposed on the third side surface 55E used as a bottom portion since the power cable 76 needs to be always mounted during the use of the projection device 2. The projection device 2 shown in FIG. 10 can cope with both horizontal placement where the projection device 2 is placed with the bottom surface 55B as a bottom portion and vertical placement where the projection device 2 is placed with the third side surface 55E as a bottom portion. The projection device 2 may include external device cable ports 53 even on the second side surface 55D. The power cable port 54 may be formed on the first side surface 55C. However, since the area of the intake or exhaust port 82 or 83 is reduced in a case where the power cable port 54 is formed, it is preferable that the power cable port 54 is disposed on the intake port 82 side less important.

Figure 16:
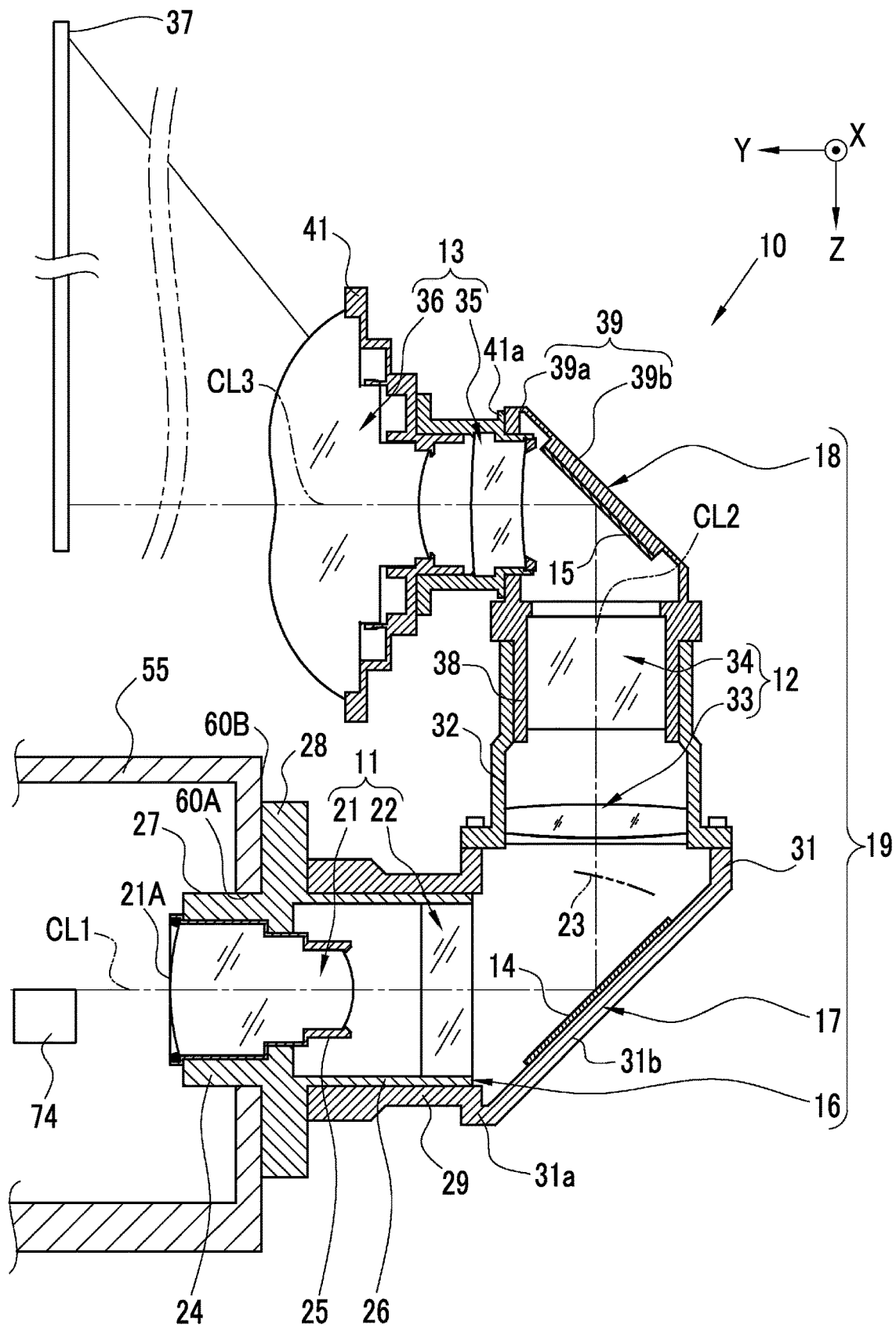
FIG. 16 is a cross-sectional view of a main part of the projection lens.

In the projection lens 10, a lens housing 89 is disposed on the distal end side of the second rotation mechanism 88B as shown in FIG. 10. The lens housing 89 is a housing that covers a member provided between the emission lens 36 and the second rotation mechanism 88B. In FIG. 16, the lens housing 89 covers a second mirror 15 that is a second optical axis bending member, and is rotatable about the axis of the second rotation mechanism 88B on a plane formed by the second direction Y and the third direction Z. Further, the emission lens 36 can also be rotated as the lens housing 89 is rotated. The lens housing 89 and the drive housing 55 are formed of molded parts made of plastic or the like. Since the corners of the lens housing 89 and the drive housing 55 have a curved shape, it is easy for a user to grasp the lens housing 89 and the drive housing 55. For this reason, a user can rotate the projection lens 10 in the first rotation direction 84 and the second rotation direction 85 (X-Z plane rotation) shown in FIG. 8 while holding the lens housing 89 in hand. Likewise, a user can rotate the projection lens 10 in the third rotation direction 86 and the fourth rotation direction 87 (Y-Z plane rotation) shown in FIG. 10 while holding the lens housing 89 in hand.

In addition, the corners of the lens housing 89 are curved in the same shape as the corners of the drive housing 55 that is a main body. Further, the side surfaces of the lens housing 89 are flush with the fourth side surface 55F and the second side surface 55D, and these surfaces are aligned with each other. Accordingly, since the lens housing 89 is combined with the projection device 2 although the projection device 2 includes the recessed portion 94, the projection device 2 has a substantially quadrangular shape. Therefore, the projection device 2 has high designability and the convenience of portability.

Subsequently, lock units for the rotation mechanisms of the projection lens 10 will be described. In FIG. 10, the first and second lock switches 90A and 90B as the lock units are provided on the surface of a portion of the projection lens 10 positioned between the first and second rotation mechanisms 88A and 88B. The first lock switch 90A locks the rotation of the first rotation mechanism 88A by being operated, and the second lock switch 90B locks the rotation of the second rotation mechanism 88B by being operated. The movement of the projection lens 10 caused by some external factors during the use of the projection device 2 can be prevented by these lock switches. Further, a user can hold and carry the projection lens 10 during the carrying of the projection device 2.

The shapes of buttons of the first and second lock switches 90A and 90B are different from each other. The first lock switch 90A has a circular shape so as to correspond to the shape of the outer periphery of a member extending from the first rotation mechanism 88A. On the other hand, the second lock switch 90B has a quadrangular shape so as to correspond to the shape of the lens housing 89 adjacent to the second rotation mechanism 88B. Since the types of the shapes of the two switches are visually distinguished from each other as described above, the convenience for a user is improved.

The first and second lock switches 90A and 90B are electrically connected to the drive circuit 75 shown in FIG. 3 by connection wiring (not shown). Then, the projection device 2 controls the mechanical mechanisms of the first and second rotation mechanisms 88A and 88B using electric power supplied from the drive circuit 75. The projection lens 10 according to this embodiment is rotated by the first and second rotation mechanisms 88A and 88B, and the connection wiring of each lock switch also receives a load caused by rotation. Particularly, in a case where the respective lock switches 90A and 90B are formed on the lens housing 89, the connection wiring needs to be disposed in the projection lens 10 so as to withstand two-axis rotation. This two-axis rotation gives a large load to the material of the connection wiring.

Accordingly, in FIG. 10, the first and second lock switches 90A and 90B are provided on the surface of the portion of the projection lens 10 positioned between the first and second rotation mechanisms 88A and 88B. Accordingly, the projection device 2 can achieve both the convenience for a user and the stability of the connection wiring. A form where the first and second rotation mechanisms 88A and 88B are electrically locked has been described, but each rotation mechanism may be a lock unit using only a mechanical structure without using electricity.

Further, the first and second lock switches 90A and 90B are disposed on the fourth side surface 55F side and are provided on the same side as the operation switches 51. In other words, the first and second lock switches 90A and 90B and the operation switches 51 are arranged on the same surface side in the projection device 2. Accordingly, a user can visually recognize and operate the operation switches 51 and the first and second lock switches 90A and 90B only by visually recognizing one surface side. Such a projection device 2 is highly convenient for a user.

Figure 11:
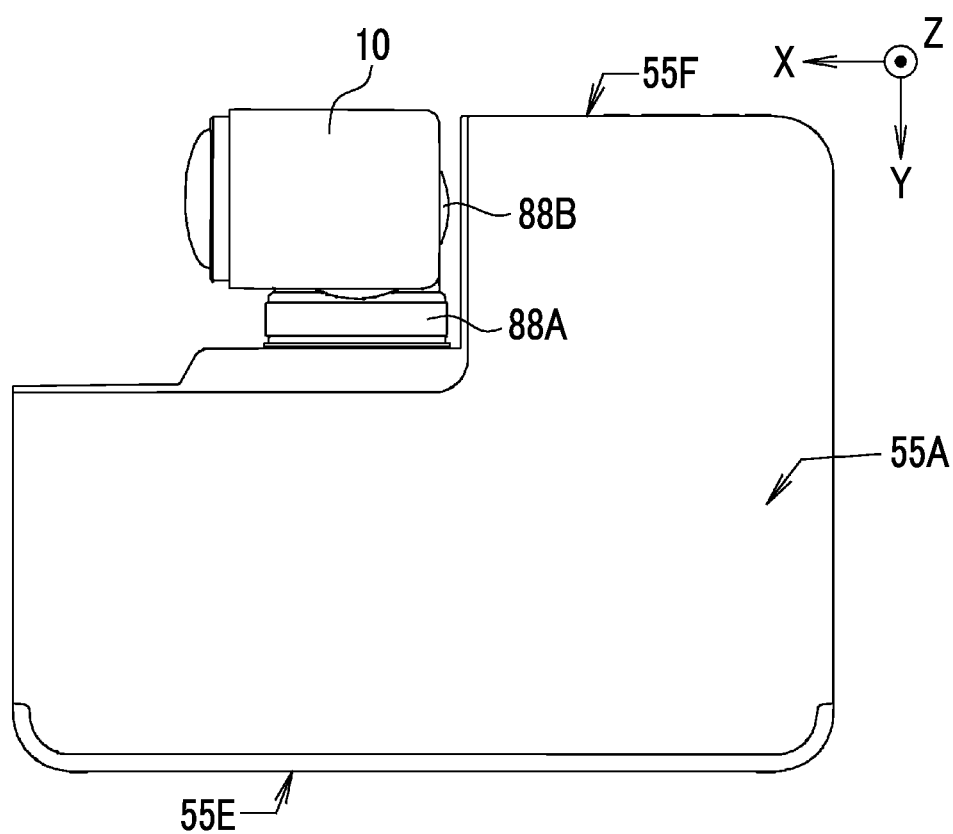
FIG. 11 is a plan view showing the use state of the projection device that is viewed from the surface side.
Figure 12:
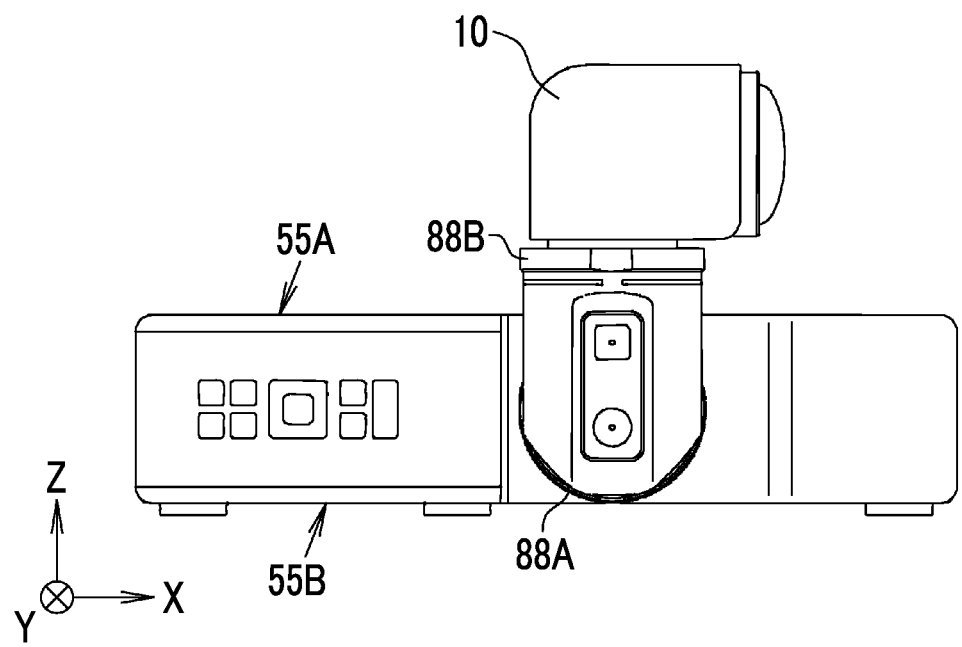
FIG. 12 is a diagram of the fourth side surface showing the use state of the projection device.
Figure 13:
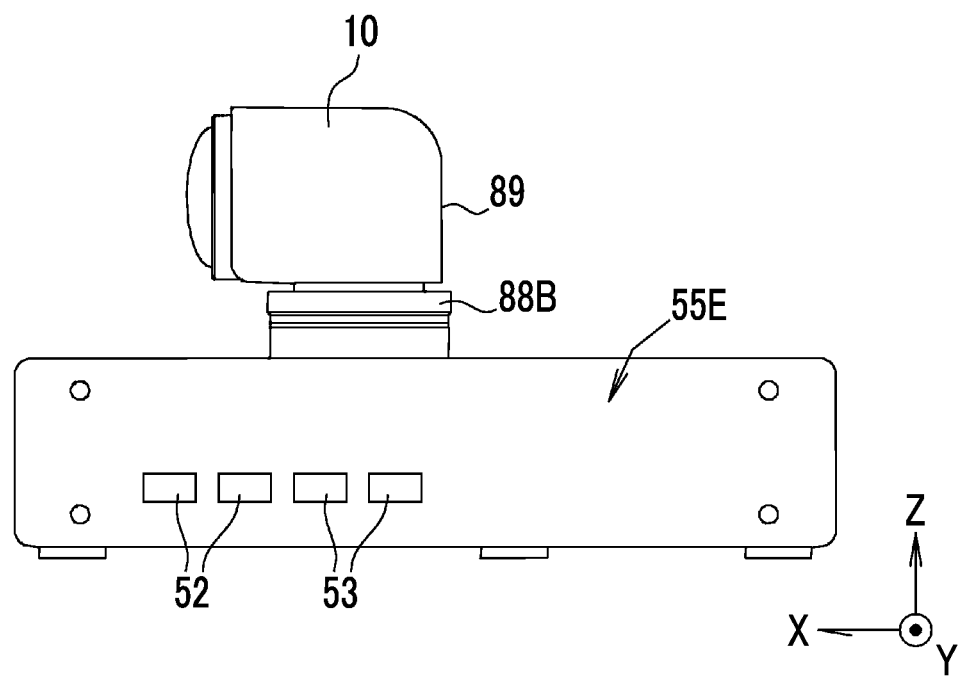
FIG. 13 is a diagram of the third side surface showing the use state of the projection device.

FIG. 11 is a plan view showing the use state of the projection device 2. FIG. 11 is a diagram where the first rotation mechanism 88A is rotated by an angle of 90° and the second rotation mechanism 88B is rotated by an angle of 90° from the storage state shown in FIG. 1. FIG. 12 is a side view showing the use state of the projection device 2. FIG. 12 is a diagram where the first rotation mechanism 88A is rotated by an angle of 90° and the second rotation mechanism 88B is rotated by an angle of 90° from the storage state shown in FIG. 8. Further, FIG. 12 is also a side view of the projection device 2 of FIG. 11 that is viewed from the fourth side surface 55F. FIG. 13 is a diagram where the first rotation mechanism 88A is rotated by an angle of 90° and the second rotation mechanism 88B is rotated by an angle of 90° from the storage state shown in FIG. 9. Furthermore, FIG. 13 is also a side view of the projection device 2 of FIG. 11 that is viewed from the third side surface 55E. As shown in FIGS. 11 to 13, the projection device 2 can change a direction where a video is to be projected by the rotation of the projection lens 10 about each of the rotation mechanisms 88A and 88B.

Figure 14:
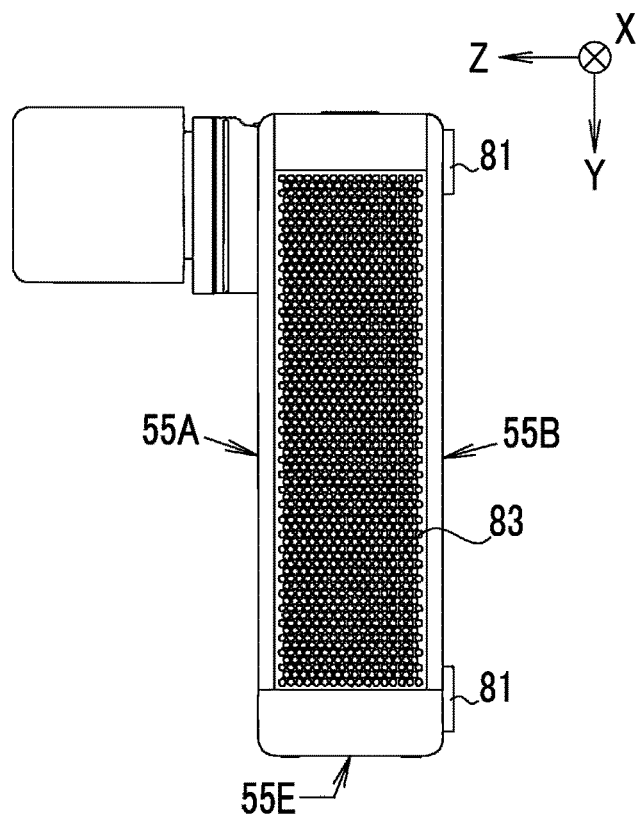
FIG. 14 is a diagram of the first side surface showing the storage state of the projection device.
Figure 15:
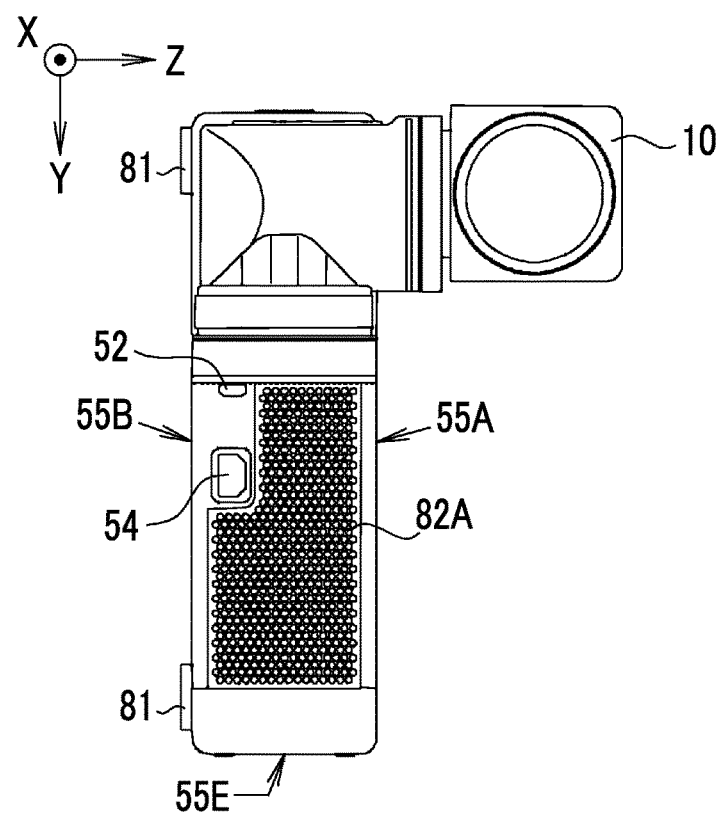
FIG. 15 is a diagram of the second side surface showing the storage state of the projection device.

FIG. 14 is a side view showing the use state of the projection device 2 that is viewed from the first side surface 55C. FIG. 14 shows a state where the projection device 2 shown in FIG. 11 is vertically placed with the third side surface 55E as a bottom portion. FIG. 15 is a side view showing the use state of the projection device 2 that is viewed from the second side surface 55D. Likewise, FIG. 15 shows a state where the projection device 2 shown in FIG. 11 is vertically placed with the third side surface 55E as a bottom portion. Since the projection device 2 includes the power cable port 54 and the video cable port 52 on the side surface as shown in FIG. 15, a trouble does not occur even though the projection device 2 is vertically placed.

<Projection Lens>

FIG. 16 is a cross-sectional view of the projection lens 10 according to this embodiment. The lens housing 89 and the first and second lock units 90A and 90B shown in FIG. 10 are omitted to describe the main part of the projection lens. The projection lens 10 comprises a first optical system 11, a second optical system 12, a third optical system 13, a first mirror 14 as a first reflecting member, a second mirror 15 as a second reflecting member, a first holding member 16, a second holding member 17, and a third holding member 18. The first to third holding members 16 to 18 form a lens barrel 19.

The first optical system 11 is composed of a first lens 21 and a second lens 22. Each of the first and second lenses 21 and 22 is shown as a single lens for the simplification of drawings, but may be actually composed of a plurality of lens groups. Light emitted by the DMD element 74 (an example of an electro-optical element) is incident on an incident portion 21A in the second direction Y. Then, luminous flux from the incident portion 21A is incident on the first optical system 11 and the first optical system 11 guides the luminous flux to the projection target. In this embodiment, the first optical system 11 forms an image, which is formed by the DMD element 74, on an image forming plane 23 as an intermediate image.

The first holding member 16 integrally holds the first optical system 11. The first holding member 16 includes a first main body part 24, a first lens frame 25, and a first mounting tube 26. The first lens frame 25 holds the first lens 21. The first main body part 24 includes a mounting portion 27 and a mounting flange 28, and holds the first lens frame 25 at the center thereof. The mounting portion 27 is inserted into an insertion hole 60A provided in the drive housing 55.

The insertion hole 60A is a through-hole that is opened to the inside of the drive housing 55. The first holding member 16 is inserted up to a position where the mounting flange 28 is in contact with a mounting surface 60B in a state where the mounting portion 27 is inserted into the insertion hole 60A. Then, the mounting flange 28 is fixed to the drive housing 55 by, for example, screwing. The first holding member 16 mounted on the drive housing 55 is inserted up to a position where the incident portion 21A of the first lens 21 (an example of the distal end face of the DMD element 74) is disposed inside the drive housing 55.

The first mounting tube 26 is connected to the first main body part 24 and holds the second lens 22 therein. The first mounting tube 26 has a cylindrical shape, and the central axis of the first mounting tube 26 coincides with an optical axis CL1 of the first optical system 11. The second holding member 17 is mounted on the first mounting tube 26 as described later.

The second holding member 17 holds the first mirror 14. The second holding member 17 includes a second mounting tube 29, a second main body part 31, and a third mounting tube 32. The second mounting tube 29 has a cylindrical shape, and is inserted so that the inner peripheral surface of the second mounting tube 29 is rotatable on the outer peripheral surface of the first mounting tube 26. The second holding member 17, the insertion hole 60A, and the mounting surface 60B form the first rotation mechanism 88A shown in FIG. 10. Further, the second holding member 17 is supported so as to be rotatable about the optical axis CL1 of the first optical system 11 together with the first mirror 14, the third holding member 18 to be described later, the second optical system 12, the third optical system 13, and the second mirror 15 by the first rotation mechanism 88A. A stopper (not shown) is provided between the first mounting tube 26 and the second mounting tube 29, and prevents the second mounting tube 29 from being separated from the first mounting tube 26 in a direction parallel to the optical axis CL1.

The second main body part 31 is connected to the second mounting tube 29 by a fixing unit, such as screws. The second main body part 31 is formed of a square tube having the shape of a substantially rectangular parallelepiped. One corner of a lower plate 31a of the second main body part 31 forms an inclined surface portion 31b. The first mirror 14 is fixed to the inner surface of the inclined surface portion 31b.

The first mirror 14 is disposed between the first optical system 11 and the image forming plane 23 for an intermediate image that is formed by the first optical system 11. The first mirror 14 bends the optical axis CL1 of the first optical system 11, which extends in the second direction Y, by reflection to form an optical axis CL2. In this embodiment, the first mirror 14 bends the optical axis CL1 by an angle of 90° to form the optical axis CL2. Accordingly, the optical axis CL2 extends in the third direction Z.

The third mounting tube 32 is fixed to the second main body part 31 by, for example, a fixing unit, such as screws, and is disposed substantially orthogonal to the second mounting tube 29 through the second main body part 31. The third mounting tube 32 has a cylindrical shape, and the third holding member 18 is mounted on the third mounting tube 32.

The third holding member 18 integrally holds the second optical system 12, the second mirror 15, and the third optical system 13. The second optical system 12 is composed of a third lens 33 (first intermediate optical system) and a fourth lens 34 (second intermediate optical system). A second lens frame 38 holds the fourth lens 34. The third mounting tube 32, the second lens frame 38 of the third holding member 18, and the like form the second rotation mechanism 88B shown in FIG. 10.

The third lens 33 (first intermediate optical system) has a diameter larger than the diameter of the fourth lens 34 (second intermediate optical system) that is rotated together with the second lens frame 38. Further, the number of lenses of the fourth lens 34 (second intermediate optical system) is larger than that of the third lens 33 (first intermediate optical system). In a case where the third lens 33 is formed to have a large size, the diameter of the fourth lens 34 composed of a plurality of lenses can be reduced. Furthermore, since the second lens frame 38 holds only the fourth lens 34, the size of the lens frame can be reduced. Accordingly, the third holding member 18 and the second optical system 12 have a compact size. The third lens 33 (first intermediate optical system) may be composed of only one lens or may be composed of a plurality of lenses.

The third optical system 13 is composed of a fifth lens 35 and an emission lens 36. Each of the third lens 33 and the emission lens 36 is shown as a single lens for the simplification of drawings, but may be actually composed of a plurality of lens groups.

Luminous flux from the first optical system 11 is incident on the second optical system 12 and the second optical system 12 guides the luminous flux to the projection target. Luminous flux from the second optical system 12 is incident on the third optical system 13 and the third optical system 13 guides the luminous flux to the projection target. In this embodiment, the second and third optical systems 12 and 13 enlarge the intermediate image, which is formed on the image forming plane 23 by the first optical system 11, and project the enlarged intermediate image onto, for example, a screen 37 that is the projection target. The first to third optical systems 11 to 13 are described in, for example, "an optical system for projection and a projection type display device" disclosed in JP2016-156986A, JP2016-156983A (corresponding to US2016/246034A1), and the like in detail, and optical systems disclosed in JP2016-156986A and JP2016-156983A can be used as the first to third optical systems 11 to 13.

The second mirror 15 is disposed between the second and third optical systems 12 and 13. The second mirror 15 bends the optical axis CL2 by reflection to form an optical axis CL3. In this embodiment, the second mirror 15 bends the optical axis CL2 by an angle of 90° to form the optical axis CL3.

In this embodiment, as described above, the incident-side optical axis CL1 of the first optical system 11 is reflected by the first mirror 14, is bent by an angle of 90°, and forms the emission-side optical axis CL2. Further, the incident-side optical axis CL2 of the second optical system 12 is reflected by the second mirror 15, is bent by an angle of 90°, and forms the optical axis CL3 extending in the second direction Y. For this reason, the optical axis CL3 is substantially parallel to the optical axis CL1 in a plane including the optical axes CL1 and CL2. That is, the projection lens 10 bends luminous flux, which is applied by the light source 64 shown in FIG. 3, in a substantially U shape by the first and second mirrors 14 and 15 and projects the luminous flux onto the projection target.

In addition, since the projection lens 10 has a substantially U-shaped optical path as described above, the lens barrel 19 holding the first optical system 11, the second optical system 12, the first mirror 14, and the second mirror 15 is a substantially U-shaped lens barrel.

The third holding member 18 includes a second lens frame 38, a third main body part 39 and a third lens frame 41. The second lens frame 38 has a cylindrical shape and holds the second optical system 12, that is, the third lens 33 and the fourth lens 34. The outer peripheral surface of the second lens frame 38 is in contact with the inner peripheral surface of the third mounting tube 32.

The third main body part 39 is connected to the second lens frame 38. The third main body part 39 is formed of a square tube having the shape of a substantially rectangular parallelepiped. One corner of an upper plate 39a of the third main body part 39 forms an inclined surface portion 39b. The second mirror 15 is fixed to the inner surface of the inclined surface portion 39b.

The third optical system 13, that is, the fifth lens 35 and the emission lens 36 are held by the third lens frame 41. Further, a flange 41a is formed on the incident-side end face of the third lens frame 41. The flange 41a of the third lens frame 41 is fixed to the third main body part 39 by, for example, a fixing unit, such as screws. Further, the third lens frame 41 is disposed substantially orthogonal to the second lens frame 38 through the third main body part 39.

In this embodiment, the third lens 33 and the fourth lens 34 composing the second optical system 12 is disposed between the first and second mirrors 14 and 15. However, the projection lens 10 may be adapted so that, for example, lenses composing the second optical system 12 are not disposed between the first and second mirrors 14 and 15. Further, the first and second mirrors 14 and 15 are not limited to mirrors that cause incident light to be specularly reflected, and may be mirrors that cause incident light to be totally reflected. Furthermore, a case where an optical path in the lens has a substantially U shape has been described, but the optical path is not limited to this shape. As shown in FIGS. 17 to 27 to be described later, the optical path in the lens may be an optical path having a shape other than a U shape depending on the rotation of the first and second rotation mechanisms 88A and 88B.

<Types of Use State of Projection Device>

Figure 17:
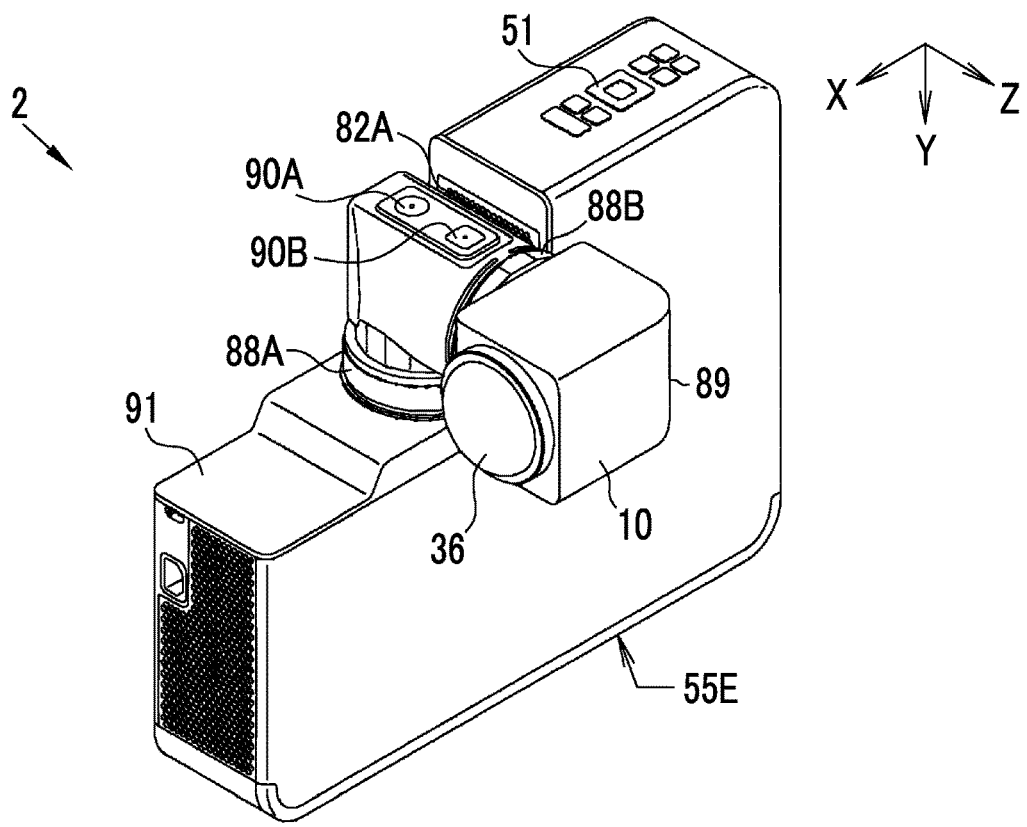
FIG. 17 is a perspective view showing the use state of the projection device.
Figure 18:
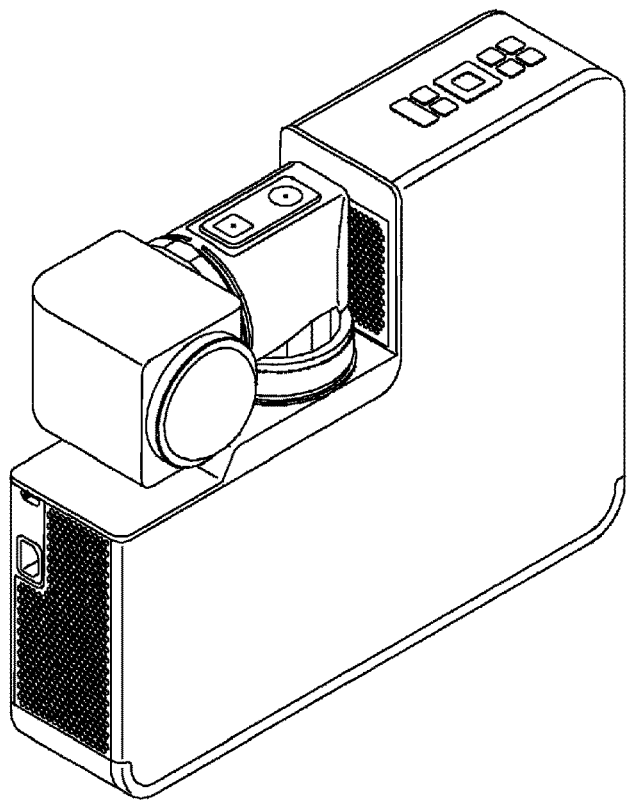
FIG. 18 is a perspective view showing the use state of the projection device.
Figure 19:
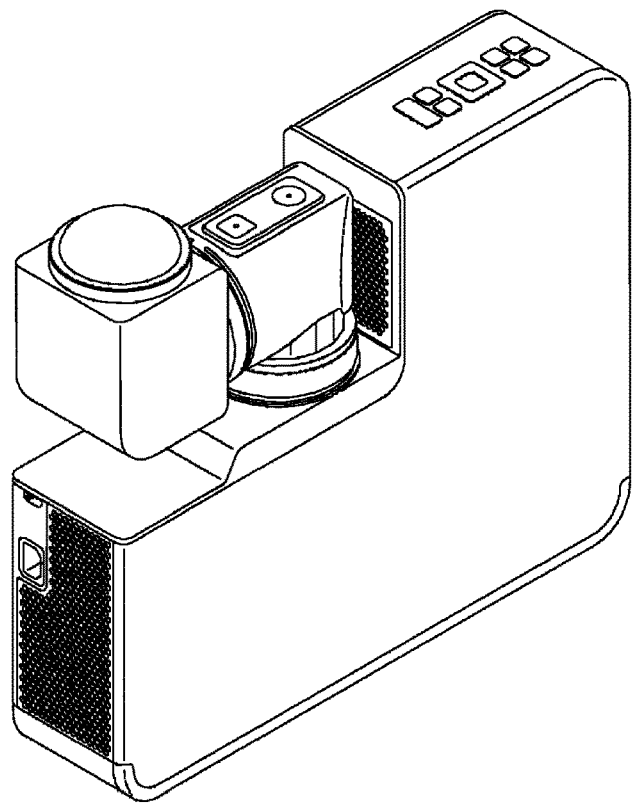
FIG. 19 is a perspective view showing the use state of the projection device.
Figure 20:
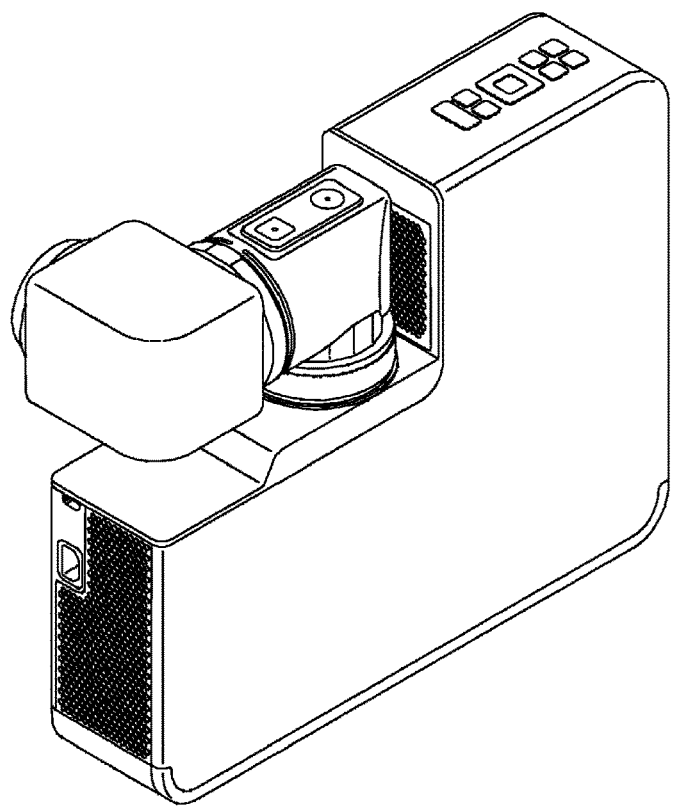
FIG. 20 is a perspective view showing the use state of the projection device.
Figure 21:
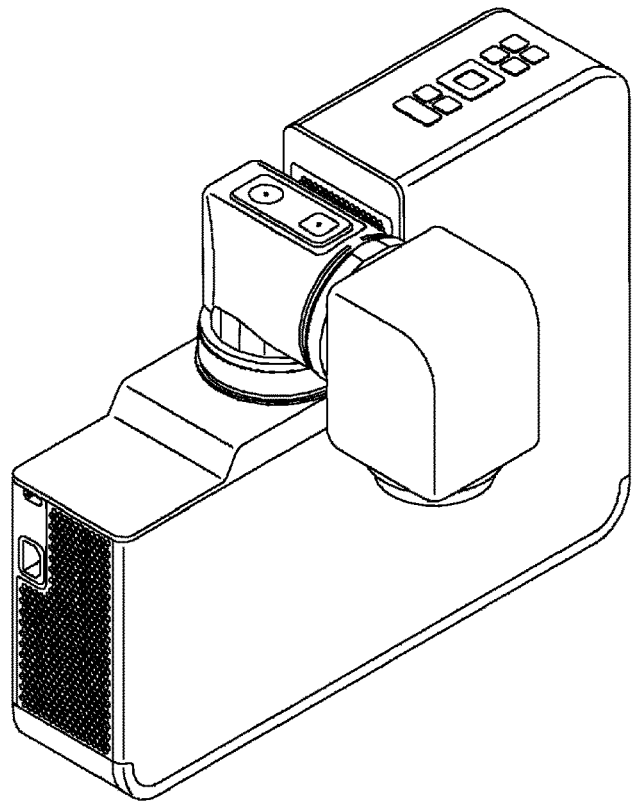
FIG. 21 is a perspective view showing the use state of the projection device.
Figure 22:
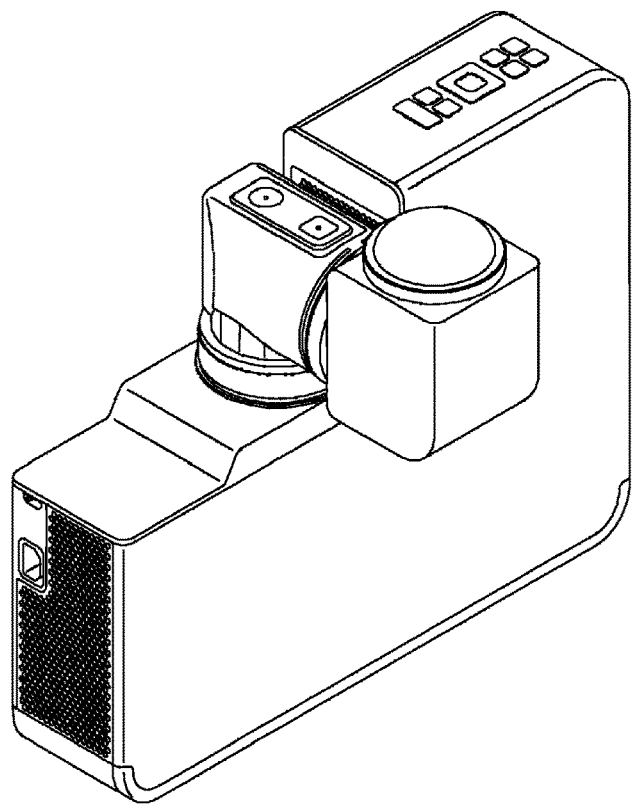
FIG. 22 is a perspective view showing the use state of the projection device.
Figure 23:
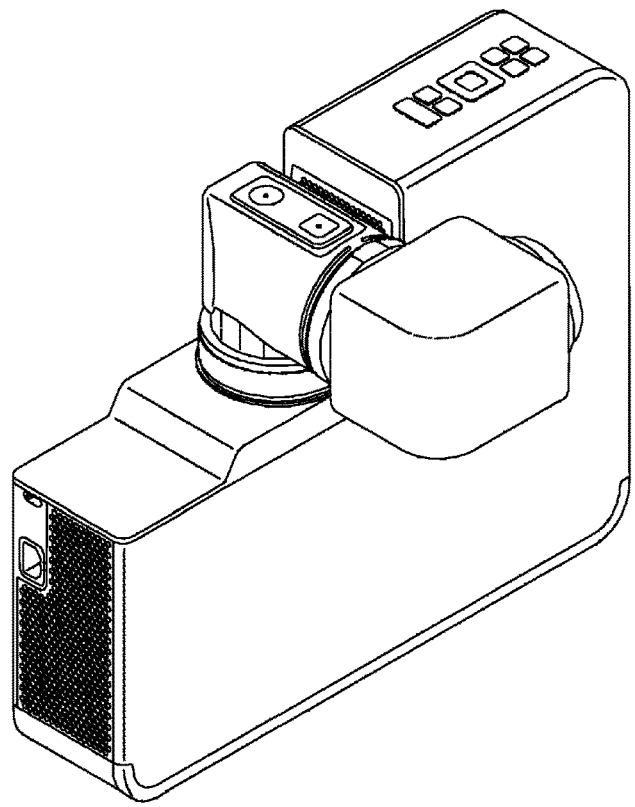
FIG. 23 is a perspective view showing the use state of the projection device.
Figure 24:
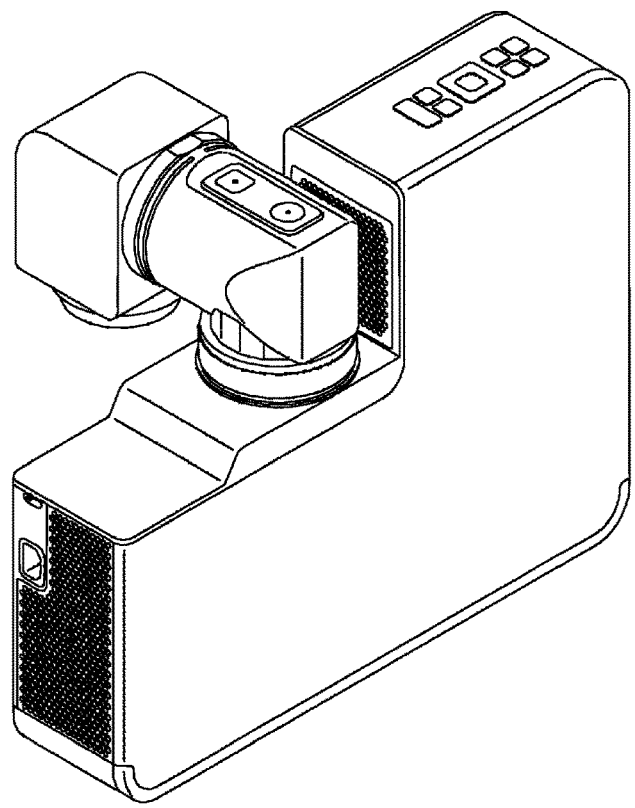
FIG. 24 is a perspective view showing the use state of the projection device.
Figure 25:
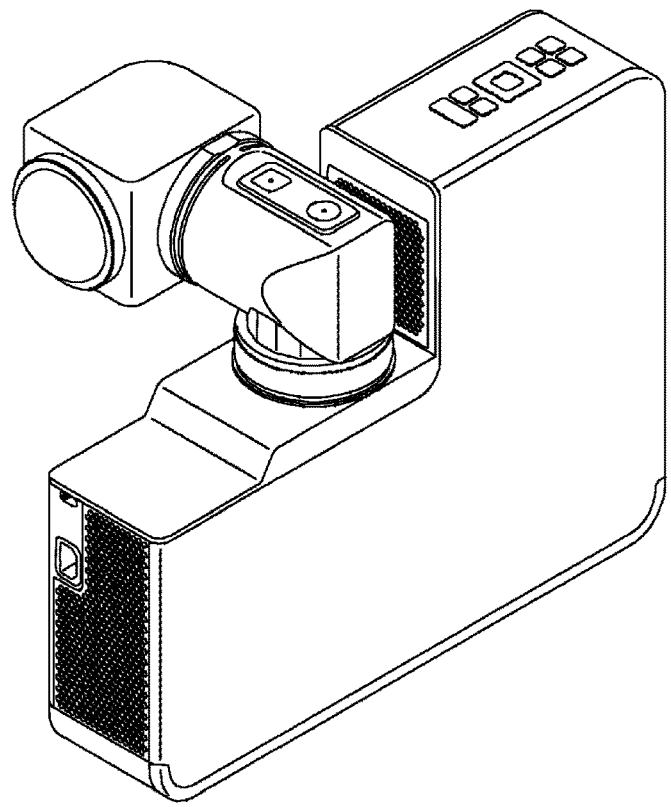
FIG. 25 is a perspective view showing the use state of the projection device.
Figure 26:
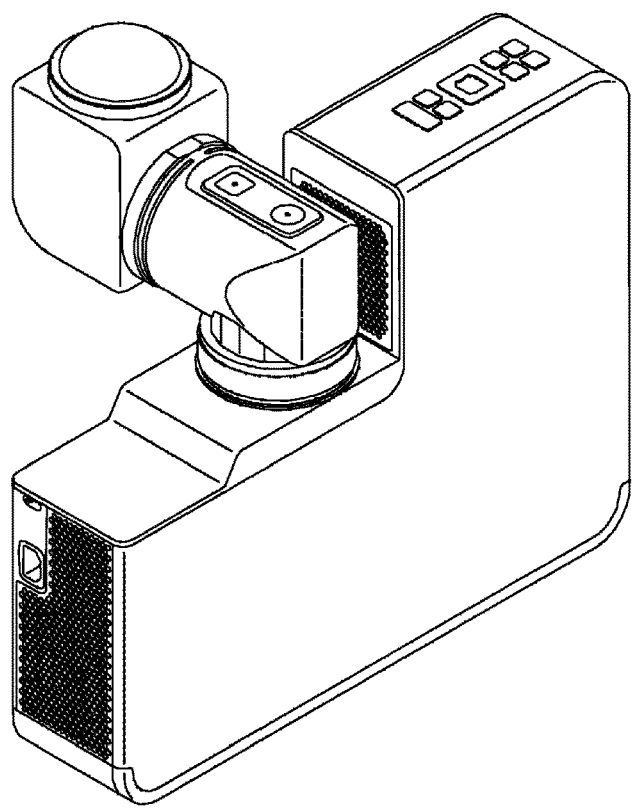
FIG. 26 is a perspective view showing the use state of the projection device.
Figure 27:
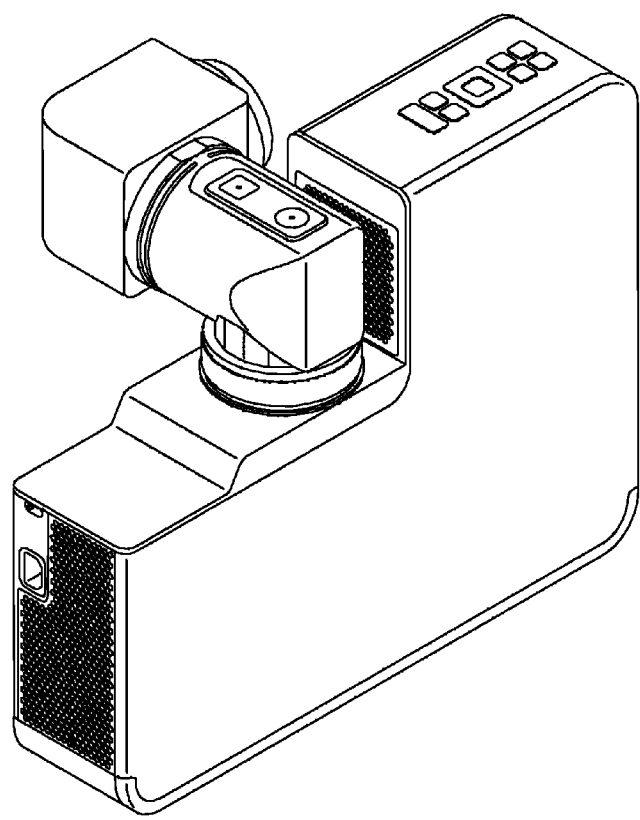
FIG. 27 is a perspective view showing the use state of the projection device.

FIG. 17 is a perspective view showing a state where the projection lens 10 of the projection device 2 is used. Further, FIG. 17 is a diagram where the projection device 2 is vertically placed with the third side surface 55E as a bottom portion and with the fourth side surface 55F as an upper portion. As compared to FIG. 10, the projection lens 10 is rotated about the first rotation mechanism 88A by an angle of 90° and is rotated about the second rotation mechanism 88B by an angle of 90°. Further, the emission lens 36 can project a video in the first direction X through this rotation.

Since a user can change the state of the projection device 2 to the use state of FIG. 17 from the storage state of FIG. 10 only by grasping the lens housing 89 and moving the arm and the wrist, the projection device 2 has high convenience for a user. Further, the operation switches 51 and the first and second lock switches 90A and 90B can be visually recognize from above in a case where the projection device 2 is vertically placed. Accordingly, the projection device 2 also has high operability for a user.

FIGS. 18 to 27 show the types of a use state other than the use state of FIG. 17. In a case where the rotation of the first rotation mechanism 88A and the rotation of the second rotation mechanism 88B are combined with each other as described above, the projection lens 10 can project a video in all directions. FIGS. 17 to 27 show cases where the projection device 2 is vertically placed. However, it goes without saying that the projection lens 10 can project a video in all directions even in a case where the state of the projection device 2 is changed into a state where the projection device 2 is horizontally placed with the bottom surface 55B as a bottom portion.

A state where the projection device 2 is disposed on a table has been described in each embodiment, but the invention can also be applied to a case where the projection device 2 is used while being suspended from a ceiling or the like. Further, an example where an image is projected onto the screen 37 has been described, but the projection target is not limited to the screen 37 and a video can be projected onto various projection targets.

EXPLANATION OF REFERENCES

2: projection device
10: projection lens
11: first optical system
12: second optical system
13: third optical system
14: first mirror
15: second mirror
16: first holding member
17: second holding member
18: third holding member
19: lens barrel
21: first lens
21A: incident portion
22: second lens
23: image forming plane
24: first main body part
25: first lens frame
26: first mounting tube
27: mounting portion
28: mounting flange
29: second mounting tube
31: second main body part
31a: lower plate
31b: inclined surface portion
32: third mounting tube
33: third lens
34: fourth lens
35: fifth lens
36: emission lens
37: screen
38: second lens frame
39: third main body part
39a: upper plate
39b: inclined surface portion
41: third lens frame
41a: flange
50: projection device main body
51: operation switch
52: video cable port
53: external device cable port
54: power cable port
55: drive housing
55A: top surface
55B: bottom surface
55C: first side surface
55C1: first A side surface
55C2: first B side surface
55D: second side surface
55D1: second A side surface
55D2: second B side surface
55E: third side surface
55F: fourth side surface
60A: insertion hole
60B: mounting surface
63: light source module
64: light source
65: phosphor wheel
66: color filter wheel
67: mirror member
68: heat sink
69: light pipe
71: TIR prism
72: relay lens
73: condenser lens
74: DMD element
75: drive circuit
76: power cable
81: foot portion
82A: first intake port
82B: second intake port
83: exhaust port
84: first rotation direction
85: second rotation direction
86: third rotation direction
87: fourth rotation direction
88A: first rotation mechanism
88B: second rotation mechanism
89: lens housing
90A: first lock switch
90B: second lock switch
91: retracting portion
92: intake fan
93: exhaust fan
94: recessed portion
95: protruding portion
96: central portion

What is claimed is:

1. A projection device comprising:
an electro-optical element;
a drive housing that stores the electro-optical element and includes a central portion and a protruding portion protruding from the central portion;
a recessed portion;
a projection lens that is disposed in the recessed portion, projects light applied from the electro-optical element onto a projection target, and includes a first rotation mechanism;
a first lock unit that is provided on the projection lens and switches a state of the first rotation mechanism between rotatable and not rotatable; and
fans that are disposed in the drive housing and draw in or discharge gas, wherein
the recessed portion and the protruding portion are adjacent to each other in a first direction, the projection lens is provided so as to extend to the recessed portion from the drive housing in a second direction crossing the first direction, the central portion includes a first A side surface that is provided in a first A direction corresponding to one side in the first direction and a second A side surface that is provided in a first B direction corresponding to the other side in the first direction, the protruding portion includes a first B side surface in the first A direction and includes a second B side surface, which faces the projection lens, in the first B direction, the fans face the second A side surface and the second B side surface, and at least one of the fans, the projection lens and the second B side surface overlap along an x axis, the x axis being normal to the second B side surface.

2. The projection device according to claim 1, wherein the projection lens includes a second rotation mechanism, and the projection lens includes a second lock unit that switches a state of the second rotation mechanism between rotatable and not rotatable.

3. The projection device according to claim 1, wherein the first lock unit and a second lock unit switch states of the first rotation mechanism and the second rotation mechanism between rotatable and not rotatable by electric control, and the first lock unit and the second lock unit are provided on a surface of a portion of the projection lens positioned between the first rotation mechanism and the second rotation mechanism.

4. The projection device according to claim 1, further comprising:

an operation switch that is provided on the drive housing and is used to operate the projection device, wherein the operation switch and the first lock unit are disposed on a same surface side in the projection device.

5. The projection device according to claim 4, wherein the operation switch, the first lock unit and a second lock unit are disposed on the same surface side in the projection device.

* * * * *